United States Patent
Liu et al.

(10) Patent No.: US 10,406,675 B2
(45) Date of Patent: Sep. 10, 2019

(54) LIVE WORKING ROBOT

(71) Applicants: STATE GRID HUNAN ELECTRIC POWER COMPANY LIVE WORKING CENTER, Changsha, Hunan (CN); STATE GRID HUNAN ELECTRIC POWER COMPANY, Changsha, Hunan (CN); STATE GRID CORPORATION OF CHINA, Beijing (CN); HUNAN PEACE PROSPERITY ELECTRIC LIMITED, Changsha, Hunan (CN)

(72) Inventors: Xiaqing Liu, Changsha (CN); Dehua Zou, Changsha (CN); Yu Yan, Changsha (CN); Jie Niu, Changsha (CN); Jianjun Zhang, Changsha (CN); Cunyun Pan, Changsha (CN); Hao Guo, Changsha (CN); Yang Long, Changsha (CN); Naicheng Ou, Changsha (CN); Zhiwen Wang, Changsha (CN)

(73) Assignees: STATE GRID HUNAN ELECTRIC POWER COMPANY LIVE WORKING CENTER, Changsha (CN); STATE GRID HUNAN ELECTRIC POWER COMPANY, Changsha (CN); STATE GRID CORPORATION OF CHINA, Beijing (CN); HUNAN PEACE PROSPERITY ELECTRIC LIMITED, Changsha (CN)

( * ) Notice: Subject to any disclaimer, the term of this patent is extended or adjusted under 35 U.S.C. 154(b) by 259 days.

(21) Appl. No.: 15/475,813

(22) Filed: Mar. 31, 2017

(65) Prior Publication Data
US 2018/0050448 A1 Feb. 22, 2018

(30) Foreign Application Priority Data

Aug. 18, 2016 (CN) .......................... 2016 1 0688240

(51) Int. Cl.
*B25J 5/02* (2006.01)
*B25J 5/00* (2006.01)
*H02G 1/02* (2006.01)

(52) U.S. Cl.
CPC . *B25J 5/02* (2013.01); *B25J 5/00* (2013.01); *H02G 1/02* (2013.01); *Y10S 901/01* (2013.01)

(58) Field of Classification Search
CPC .... B61B 3/00; B61B 3/02; B61B 7/00; B61B 7/06; B61B 9/00; B25J 5/00; B25J 5/02; B65G 25/00; B65G 25/02
See application file for complete search history.

(56) References Cited

U.S. PATENT DOCUMENTS

2015/0044009 A1* 2/2015 Yang ........................ H02G 1/04
414/751.1

* cited by examiner

*Primary Examiner* — Robert J McCarry, Jr.
(74) *Attorney, Agent, or Firm* — Vidas Arrett & Steinkraus P.A.

(57) ABSTRACT

The invention relates to the electric power field, in particular to a live working robot used for running and operating along wires of high-voltage transmission lines, which can realize obstacle surmounting of the live working robots along the wires safely and conveniently, comprising: a main body; a walking mechanism, wherein the walking mechanism comprises three walking arms installed on the main body and spaced apart from one another, a rolling wheel is arranged at an end of each walking arm and is in an online state when being located on an upper surface of a wire or in an offline state when being separated from the wire; the rolling wheels of at least two walking arms are in the online state; at least one part of the walking arm can extend and retract in the vertical direction to change the vertical position of the (Continued)

rolling wheel relative to the wire, and at least one walking arm has a rotatable portion which can rotate to change the position of the rolling wheel relative to the wire; a mounting mechanism, comprising a hook and a sling connecting the hook to the main body; and a working arm, installed on the main body and provided at its end with a tool interface.

17 Claims, 3 Drawing Sheets

LIVE WORKING ROBOT

TECHNICAL FIELD

The invention relates to the electric power field, in particular to a live working robot.

BACKGROUND OF THE INVENTION

Currently, live working robots applied to high-voltage transmission lines mainly include control handle type live working robots and remote control type live working robots. Operators of control handle type live working robots control working jibs of the robots via operating handles, while operators of remote control type live working robots remotely control robots in the air from the ground.

At present, the design of related robots at home and abroad comprises the phase series control handle type live robots developed by Japanese Motoman, inspection robots developed by the Canadian HydroQuebec Institute, live working robots developed by the American Electric Power Research Institute, Dream |remote control type live working robots developed by live working center of State Grid Corporation of China (Hunan), etc.

A live working robot walking mechanism is disclosed in patent literature CN 200920166530.8, the entire contents of which are hereby incorporated by reference. The live working robot walking mechanism is used for walking on 500 kV transmission lines to work, and comprises a rectangular base, four external crane jibs and four internal crane jibs. A walking wheel is arranged on each crane jib, a walking motor is installed on each walking wheel, and the four external crane jibs and the four internal crane jibs are driven by one motor to open and close respectively. The eight crane jibs are divided into two groups, with only two degrees of freedom. The live working robot can surmount obstacle(s) via alternate opening and closing of the external crane jibs and the internal crane jibs. The two groups of walking wheels are erected on two same-phase wires respectively.

A patent literature CN 200920108932.2, the entire contents of which are hereby incorporated by reference, discloses a wire-obstacle-surmounting robot walking device which adopts a double-arm and three-joint wheel type structure and comprises a body and a mechanical arm connected with the body. The mechanical arm is formed by a joint arm, a walking wheel arm and a pressing wheel arm; two ends of the joint arm are movably connected with one end of a drive shaft of a gear motor arranged in the body and one end of the walking wheel arm, and the other end of the walking wheel arm is movably connected with a walking wheel sliding along a wire. The middle portion of the walking wheel is movably connected with the pressing wheel arm with a pressing wheel.

However, in the prior robot design, it is complex in the obstacle surmounting structure and is unstable in operation, which influences live working of the robots on the wires.

SUMMARY OF THE INVENTION

In view of this, the invention discloses a live working robot used for running and operation along wires of high-voltage transmission lines, which can realize obstacle surmounting of the live working robots along the wires safely and conveniently.

According to an embodiment of the invention, a live working robot used for running and operating along wires of high-voltage transmission lines is provided and comprises:

a main body;

a walking mechanism, wherein the walking mechanism comprises three walking arms installed on the main body and spaced apart from one another, a rolling wheel is arranged at an end of each walking arm and is in an online state when being located on an upper surface of a wire or in an offline state when being separated from the wire; the rolling wheels of at least two walking arms are in the online state; at least one part of the walking arm can extend and retract in the vertical direction to change the vertical position of the rolling wheel relative to the wire, and at least one walking arm has a rotatable portion which can rotate to change the position of the rolling wheel relative to the wire;

a mounting mechanism, comprising a hook and a sling connecting the hook to the main body; and a working arm, installed on the main body and provided at its end with a tool interface.

Preferentially, in any embodiment of the invention, the rotatable portion of at least one of the walking arms can rotate in the horizontal plane to change the horizontal position of the rolling wheels relative to the wire.

Preferentially, in any embodiment of the invention, the rotatable portion of each of the walking arms can rotate in the horizontal plane to change the horizontal position of the rolling wheels of the walking arms relative to the wire.

Preferentially, in any embodiment of the invention, the rotatable portion of at least one of the walking arms can rotate in the non-horizontal plane to change the horizontal position and/or vertical position of the rolling wheels relative to the wire.

Preferentially, in any embodiment of the invention, at least one of the walking arms extends along a straight line, a broken line or a curve.

Preferentially, in any embodiment of the invention, a front walking arm of the walking arms is provided with a front pressing wheel, wherein the rolling wheel of the front pressing arm is aligned with the front pressing wheel and the wire is clamped between the rolling wheel and the front pressing wheel;

and/or a rear walking arm of the walking arms is provided with a rear pressing wheel, wherein the rolling wheel of the rear pressing arm is aligned with the rear pressing wheel and the wire is clamped between the rolling wheel and the rear pressing wheel.

Preferentially, in any embodiment of the invention, the front walking arm of the walking arms is provided with a clamping jaw for grasping the wire;

and/or the rear walking arm of the walking arms is provided with a clamping jaw for grasping the wire.

Preferentially, in any embodiment of the invention, the walking arms comprise a front walking arm, a middle walking arm and a rear walking arm in sequence along the advancing direction of the live working robot, wherein the rolling wheels of the front walking arm and the rear walking arm are drive rolling wheels connected to a drive motor, and the rolling wheel of the middle walking arm is a driven rolling wheel.

Preferentially, in any embodiment of the invention, the vertical telescopic movement of the walking arm is driven by a telescopic movement motor and the rotary movement of the walking arms is driven by a rotating movement motor;

or each of the walking arms is independently driven by its own drive motor.

Preferentially, in any embodiment of the invention, the rotatable portions of the three walking arms are located on different sides of the wire.

Preferentially, in any embodiment of the invention, the working arm has three degrees of freedom of movement in three mutually orthogonal directions.

Preferentially, in any embodiment of the invention, the working arm is movably installed on the main body and is moveable in a direction parallel to the advancing direction of the live working robot.

Preferentially, in any embodiment of the invention, the mounting mechanism comprises a winch structure fixed to the main body and a positioning structure connected to the winch structure, wherein the sling connected with the hook penetrates through the positioning structure to wind on the winch structure.

Preferentially, in any embodiment of the invention, the positioning structure comprises a cone base below the hook, wherein the cone base has a conical hole and a central hole, with conical hole aligned with a cone located at a lower end of the hook and the sling extending to penetrate through the central hole.

Preferentially, in any embodiment of the invention, the positioning structure comprises a supporting fork located below the cone base, and the cone base is supported within the supporting fork and can rotate relative to the supporting fork.

Preferentially, in any embodiment of the invention, the winch structure comprises a drive reel installed on a drive reel seat and two driven reels installed on a driven reel seat, wherein the drive reel seat and the driven reel seat are hinged to each other at the edges thereof, the sling penetrates through the positioning structure and then sequentially winds on one of the driven reels, the drive reel and the other of the driven reels, so as to extend along a shape of "8".

Preferentially, in any embodiment of the invention, the mounting mechanism comprises a mounting motor and a transmission system connected to the mounting motor.

Preferentially, in any embodiment of the invention, pinion is installed on the main body; a big gear engaged with the pinion is fixedly arranged on the positioning structure.

With the embodiments of the invention, the live working robot used for running and operating along wires of high-voltage transmission lines can realize obstacle surmounting of the live working robots along the wires safely and conveniently.

DETAILED DESCRIPTION OF EXEMPLARY EMBODIMENTS

Figure 1:
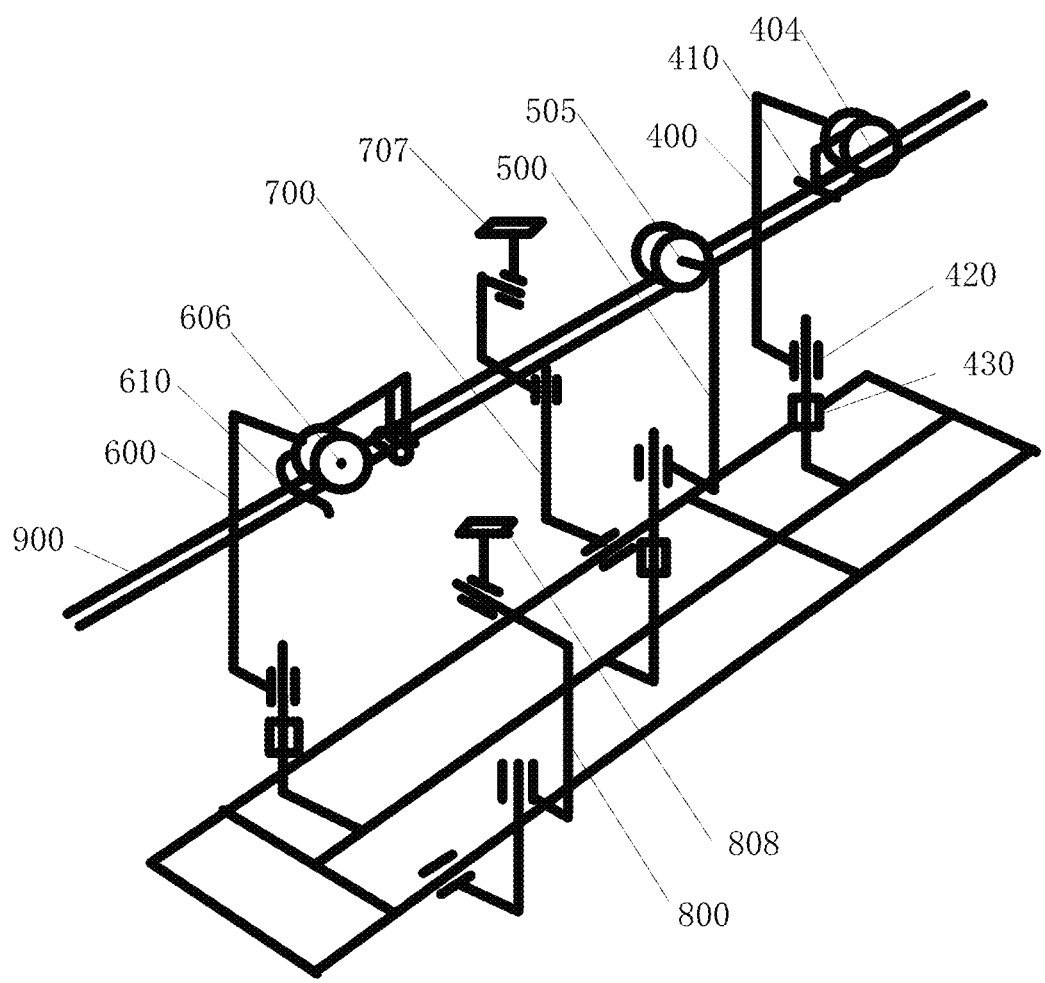
FIG. 1 is the structure diagram of a live working robot according to an embodiment of the invention.

To make the purpose, technical solutions and advantages of the invention clearer, the invention will be explained in detail in combination with the specific embodiments and with reference to the drawings.

In view of this, the invention discloses a live working robot used for running and operating along wires of high-voltage transmission lines, which can realize obstacle surmounting of the live working robots along the wires safely and conveniently.

According to an embodiment of the invention, a live working robot used for running and operating along wires of high-voltage transmission lines is provided and comprises:

a main body;

a walking mechanism, wherein the walking mechanism comprises three walking arms installed on the main body and spaced apart from one another, a rolling wheel is arranged at an end of each walking arm and is in an online state when being located on an upper surface of a wire or in an offline state when being separated from the wire; the rolling wheels of at least two walking arms are in the online state; at least one part of the walking arm can extend and retract in the vertical direction to change the vertical position of the rolling wheel relative to the wire, and at least one walking arm has a rotatable portion which can rotate to change the position of the rolling wheel relative to the wire;

a mounting mechanism, comprising a hook and a sling connecting the hook to the main body; and a working arm, installed on the main body and provided at its end with a tool interface.

Therefore, the live working robot (referred to as the robot for short) can be installed on a wire of a high-voltage transmission line through the mounting mechanism, operates on the wire through the walking mechanism, and can conduct operations (such as wire servicing) through the working arms (such as through a tool installed thereon via the tool interface). The walking mechanism may have an obstacle surmounting function and can surmount all parts (i.e. the obstacle(s)) arranged along the wires of the high-voltage transmission lines, such as shockproof hammers, insulators and spacers, so as to realize successful running and working along the wires.

In particular, the walking mechanism may be provided with three walking arms (such as a front walking arm, a middle walking arm and a rear walking aim arranged in sequence along the advancing direction), and each walking arm can run/walk on the wire through the rolling wheel arranged at the end of the walking arm.

When the robot runs/walks on the wire normally, rolling wheels of at least two of the walking arms (such as the front walking arm and the rear walking arm) are in the online state, so as to keep the robot hung on the wire. Also, when the robot runs/walks normally, rolling wheels of even more walking arms (such as all the three walking arms) may be in the online state.

In a preferential embodiment, when the robot runs/walks on the wire normally, the robot is kept hanging on the wire through rolling wheels of the front walking arm and the rear walking aim. That is it because the wire is flexible and has certain sag due to the self weight thereof. Therefore, if the rolling wheels of three walking arms are walking on the wire simultaneously, it may incur mutual interference and thus influence the operating stability and safety of the robot.

When facing an obstacle in front during advancing, the walking arm can, by its movement relative to the wire (such as rotary or translational movement), enable the portion at its end (having the rolling wheel) to be released/detached from the wire (i.e. to be in the offline state) so as to avoid the obstacle installed on the wire, and can return onto the wire (i.e. be back to the online state) after surmounting (or bypassing) the obstacle so as to keep running on the wire. In the process that the walking arm is in the offline sate to surmount (or bypass) the obstacle, the other non-offline (i.e. online) walking arm(s) may still be supported on the wire, so as to ensure the whole live working robot is kept to be connected (such as hung) on the wire.

Therefore, the three walking arms can surmount (or bypass) the obstacle(s) on the wire alternately, and when the last walking arm surmounts (or bypasses) the obstacle and returns onto the wire, the whole obstacle surmounting operation of the live working robot is completed.

As can be seen from above, the live working robot, when running and operating along wires of high-voltage transmission lines, can realize obstacle surmounting of the live working robots along the wires safely and conveniently by means of the walking mechanism.

Although the operation (especial the obstacle surmounting operation) of the live working robot is described with the walking mechanism having three walking arms as an example in the above embodiments, it should be understood that as required, the walking mechanism may be provided with more walking arms to realize its specific purpose(s) (such as improving the operation stability), which is also within the protection scope of the invention.

Preferentially, in any embodiment of the invention, the rotatable portion of at least one of the walking arms can rotate in the horizontal plane to change the horizontal position of the rolling wheels relative to the wire.

Preferentially, in any embodiment of the invention, the rotatable portion of each of the walking arms can rotate in the horizontal plane to change the horizontal position of the rolling wheels of the walking arms relative to the wire.

In an embodiment, each of the three walking arms may rotate only in the horizontal plane (i.e. cannot rotate in other direction).

For example, in an embodiment, each of the three walking arms (such as a front walking arm, a middle walking arm and a rear walking arm) has two degrees of freedom of movement, that is, each walking arm can move vertically (such as linear upward or downward movement in the vertical direction), and can also use its rotatable portion to rotate in the horizontal plane (such as rotation based on the advancing direction or the wire extending direction) so as to rotate leftwards or rightwards such that it can leave the wire and avoid (surmount or bypass) the obstacle(s) on the wire, thereby realizing obstacle surmounting operation.

In an embodiment, each degree of freedom of movement (corresponding to the upward or downward movement or the rotary movement) of the walking arm may be independently driven by a motor.

Preferentially, in any embodiment of the invention, the rotatable portion of at least one of the walking arms can rotate in the non-horizontal plane to change the horizontal position and/or vertical position of the rolling wheels relative to the wire.

To enable the walking arms (especially the rolling wheels at the ends of the walking arms) to release from the wire so as to avoid obstacle(s) on the wire, the walking arms may use various feasible designs as required, with no need of being limited to the rotary movement in the horizontal plane only. For example, in an embodiment, the rotatable portions of the walking arms may rotate in the non-horizontal plane (such as the vertical or slanting plane), i.e. turning over downwards from the left or right side with respect to the advancing direction of the live working robot or the wire extending direction, such that the end portions (having the rolling wheels) or the online portions of the walking arms may release from the wire (i.e. be in the offline state) to avoid obstacle(s) installed on the wire, and can surmount (or bypass) the obstacle(s) and then return to the wire (i.e. return to the online state) so as to keep running on the wire. Therefore, the three walking arms can surmount (or bypass) the obstacle on the wire alternately, and when the last walking arm surmounts (or bypasses) the obstacle and returns to the wire, the overall obstacle surmounting operation of the live working robot is completed.

It should be understood that the structures of the three walking arms may be same or similar, or may be different. For example, in an embodiment, the rotatable portion of one of the walking arms (such as the middle walking arm) may rotate in the non-horizontal plane (such as the vertical plane or slanting plane), i.e. turning over downwards from the left side or the right side with respect to the advancing direction of the live working robot or the wire extending direction, such that the end portion (having the rolling wheel) or the online portion of the middle walking arm may release from the wire (i.e. be in the offline state) to avoid the obstacle(s) installed on the wire, and can surmount (or bypass) the obstacle(s) and then return onto the wire (i.e. returning back to the online state), so as to further run on the wire. In contrast thereto, the rotatable portions of the other two walking arms (such as the front walking arm and the rear walking arm) may rotate in the horizontal plane, i.e. rotate leftwards or rightwards with respect to the advancing direction of the live working robot or the wire extending direction, such that the end portions or online portions (having the rolling wheels) of the front walking arm and the rear walking arm may release from the wire (i.e. be in the offline state) to avoid obstacle(s) installed on the wire, and can surmount (or bypass) the obstacle(s) and then return onto the wire (i.e. return back to the online state), so as to further run on the wire.

Preferentially, in any embodiment of the invention, at least one of the walking arms extends along a straight line, or a broken line/fold line, or a curve.

In an embodiment, the rear walking arm and the middle walking arm of the three walking arms of the walking mechanism may be provided with a structure in shape of straight line or broken line/fold line.

In one preferential embodiment, the front walking arm of the three walking arms of the walking mechanism may be provided with a structure in shape of broken line/fold line or of curve, such as a bent arm structure, so as to achieve an increased obstacle surmounting distance.

In an embodiment, the walking arm in shape of broken line/fold line may comprise three sections, wherein two adjacent sections may be perpendicular to each other. In a further embodiment, the two adjacent sections may be connected with each other through a rotatable joint, so as to facilitate rotary movement in the obstacle surmounting operation.

In an embodiment, the maximum obstacle surmounting distance may be 400 mm.

The distance between the three walking arms of the walking mechanism may be set as required. Preferentially, the walking arm may have an adjustable structure so as to adjust the distance between the adjacent walking arms appropriately.

In an embodiment, the distance between the middle walking arm and the rear walking arm may be larger than that between the middle walking arm and the front walking arm.

Preferentially, in any embodiment of the invention, a front walking arm of the walking arms is provided with a front pressing wheel, wherein the rolling wheel of the front pressing arm is aligned with the front pressing wheel and the wire is clamped between the rolling wheel and the front pressing wheel.

Preferentially, in any embodiment of the invention, a rear walking arm of the walking arms is provided with a rear pressing wheel, wherein the rolling wheel of the rear pressing arm is aligned with the rear pressing wheel and the wire is clamped between the rolling wheel and the rear pressing wheel.

When the live working robot runs/walks on the wire, the upper pressing wheel and the lower pressing wheel can have effects of position limiting and protection, being advantageous especially when the robot is climbing, thus can improve the operation safety and stability of the robot.

Preferentially, in any embodiment of the invention, the front walking arm of the walking arms is provided with a clamping jaw for grasping the wire.

Preferentially, in any embodiment of the invention, the rear walking arm of the walking arms is provided with a clamping jaw for grasping the wire.

When the live working robot runs/walks on the wire, the clamping jaw can have effects of position limiting and protection.

In an embodiment, the middle walking arm may be provided with a clamping jaw for grasping the wire.

Preferentially, in any embodiment of the invention, the walking arms comprise a front walking arm, a middle walking arm and a rear walking arm in sequence along the advancing direction of the live working robot, wherein the rolling wheels of the front walking arm and the rear walking arm are drive rolling wheels connected to a drive motor, and the rolling wheel of the middle walking arm is a driven rolling wheel.

Preferentially, in any embodiment of the invention, the vertical telescopic movement of the walking arm is driven by a telescopic movement motor and the rotary movement of the walking arms is driven by a rotating movement motor.

In an embodiment, the telescopic movement of the three walking arms may be driven by a single telescopic movement motor; while in other embodiments, the telescopic movement of the three walking arms may be driven by three telescopic movement motors, respectively.

In an embodiment, the rotary movement of the three walking arms may be driven by a single rotary movement motor; while in other embodiments, the rotary movement of the three walking arms may be driven by three rotary movement motors, respectively.

Preferentially, in any embodiment of the invention, each of the walking arms is independently driven by its own drive motor.

Preferentially, in any embodiment of the invention, the rotatable portions of the three walking arms are located on different sides of the wire.

In other words, the rotatable portions of two of the three walking arms are located on one side of the wire while the rotatable portion of the other of the walking arms is located on the other side of the wire. Therefore, the good overall counterweight state of the robot can be realized, and thus the safe and stable operation is ensured.

There is a conflict between the number of tasks that the live working robot can complete and the self weight of the robot. Solutions to this conflict include reducing the weight of the robot and using a compact structure, wherein the working arm can use a modular design. For various operating tasks to be done by the robot, different operating tools may be designed or provided, and the corresponding tools can be installed to the tool interface formed in the end of the working arm according to demand of the operating tasks. The tool interface in the end of the working arm may have a specific design, such as a slider included which has a dovetail groove, to facilitate installment of different tools.

In an embodiment, the robot can complete three operating tasks such as live replacing insulators, replacing shockproof hammers, and fastening strain clamps, so three sets of corresponding operating tools can be provided accordingly. Each operating tool may be provided with a corresponding interface (such as being provided at the bottom of the operating tool) by which the operating tool can be connected with the tool interface formed in the end of the working arm, thus facilitating mounting and demounting. For example, the operating tool may be connected with a longitudinally movable slider of the working arm through a dovetail groove.

Preferentially, in any embodiment of the invention, the working arm has three degrees of freedom of movement in three mutually orthogonal directions (such as translational movements in the three mutually orthogonal directions).

Therefore, with the cooperative movement in the three directions, the operating tools connected via the tool interface can reach the proper operating space or position for operation, thereby meeting the requirements of operating tools for the operating position.

In an embodiment, alternatively or additionally, the working arm may have other degrees of freedom of movement, such as the degree of freedom of rotation.

In one preferential embodiment, the precision of movement of the working arm in the three directions may be 0.1 mm, so as to meet the requirement for the operating precision.

Preferentially, in any embodiment of the invention, the working arm is movably installed on the main body and is moveable in a direction parallel to the advancing direction of the live working robot.

Therefore, in the advancing and operating process of the live working robot, especially in the obstacle surmounting process thereof, the working arm may move to appropriate positions as required, so as to realize overall counterweight balance of the robot, thus ensuring stability and safety of the robot on the wire.

FIG. 1 is the structure diagram of a live working robot according to an embodiment of the invention.

In the embodiment shown in FIG. 1, a live working robot used for running and operating along wires of high-voltage transmission lines is provided, comprising:

a main body;

a walking mechanism, wherein the walking mechanism comprises three walking arms installed on the main body and spaced apart from one another (i.e. a front walking arm 400, a middle walking arm 500 and a rear walking arm 600 in sequence from right to left in FIG. 1), a rolling wheel 404, 505, 606 is arranged at an end of each walking arm and is in an online state when being located on an upper surface of a wire 900 or in an offline state when being released/separated/detached from the wire 900; the rolling wheels of at least two walking arms are in the online state; at least one part of the walking arm can extend and retract in the vertical direction to change the vertical position of the rolling wheel relative to the wire, and at least one walking arm has a rotatable portion which can rotate to change the position of the rolling wheel relative to the wire;

a mounting mechanism (not shown in FIG. 1), comprising a hook and a sling connecting the hook to the main body; and a working arm 700, 800, installed on the main body and provided at its end with a tool interface (in the embodiment of FIG. 1, the working arms 700, 800 are provided with respective tools 707, 808 through corresponding tool interfaces for serving and other operations).

In the embodiment shown in FIG. 1, the front walking arm 400 is provided with a front pressing wheel 410; and the rear walking arm 600 is provided with a rear pressing wheel 610.

In the embodiment shown in FIG. 1, the front walking arm 400 realizes vertical telescopic movement through a movable joint 420 and realizes rotation of at least one part thereof (such as its rotatable portion) through a rotatable joint (or rotating joint) 430, such that the movement (such as upward or downward movement or rotating movement) needed by the rolling wheel 404 at the end of the front walking arm 400 can be realized, such as moving onto the wire 900 to be in position (being in the online state) or releasing from the wire 900 (to be in the offline state), thereby realizing corresponding operations of the live working robot, such as mounting operation on the wire and obstacle surmounting operation. Similarly, the rear walking arm 600 and/or the middle walking arm 500 may also be provided with similar moveable joints and rotatable joints, which will not be repeated herein.

In the embodiment of FIG. 1, the walking arms (such as the front walking arm 400 or the rear walking arm 600) may take the fold-line shaped design, which is in C shape in FIG. 1 (wherein the walking arm comprises three sections bent in different angles, and adjacent sections may be perpendicular to each other, for example). For example, it may comprise two sections extending in the horizontal direction and the third section extending in the vertical direction between the two sections.

FIGS. 2a-2i are the schematic diagrams illustrating that the live working robot according to an embodiment of the invention realizes obstacle surmounting operation via a walking mechanism having three walking arms.

Figure 2:
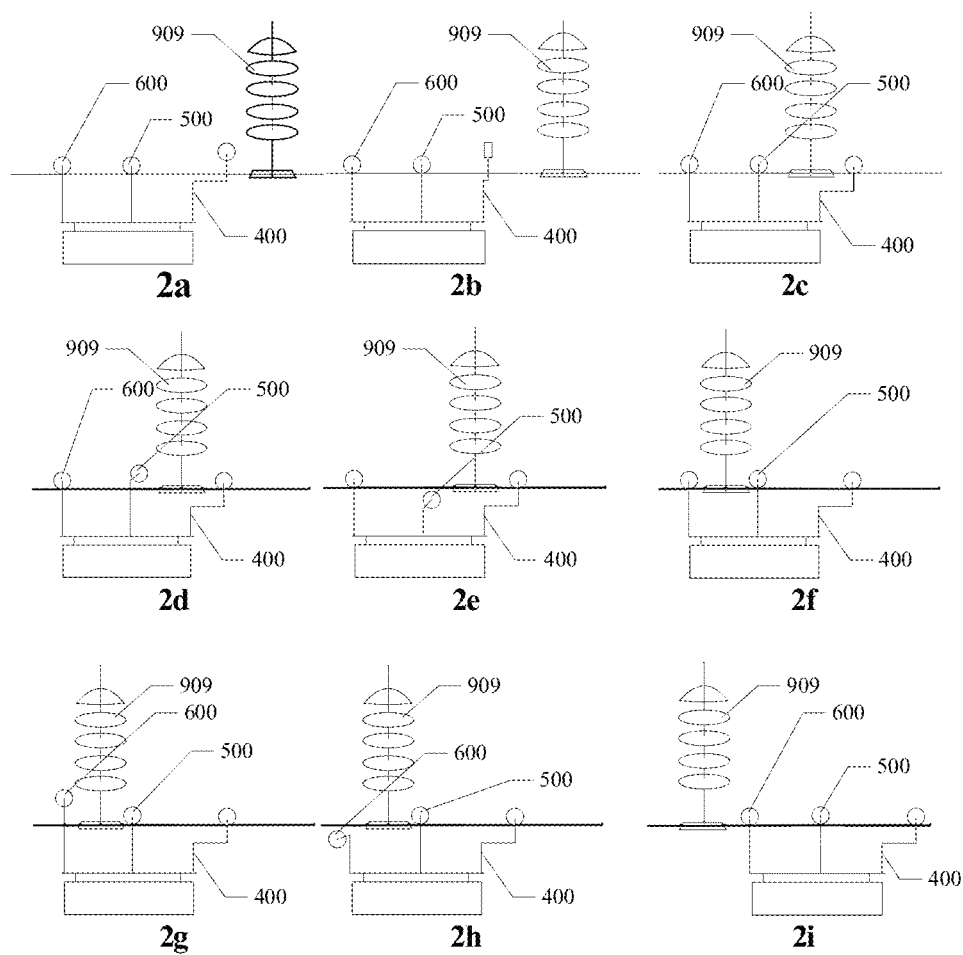
FIGS. 2a-2i are the schematic diagrams illustrating that the live working robot according to an embodiment of the invention realizes obstacle surmounting operation via a walking mechanism with three walking arms.

As shown in the embodiment(s) of FIGS. 2a-2i, obstacle(s) 909 (such as insulators) may be installed on the wire, and the walking mechanism can realize the following obstacle surmounting operations via its front walking arm 400, middle walking arm 500 and rear walking aim 600 (located at the right, middle and left positions respectively in FIGS. 2a-2i):

The front walking arm may stop in front of the obstacle(s) (on the right side of the front walking arm in FIG. 2a) (wherein the front pressing wheel, if provided, may be released), the rolling wheel of the front walking arm rises (it should be understood that the rolling wheel may rise by itself, or may rise by the telescopic movement of a telescopic portion, such as a telescopic joint or the like, of the front walking arm), such that the rolling wheel can release from the wire, i.e. being in the offline state, as shown in FIG. 2a.

The rotatable portion of the front walking arm (such as the end portion having the rolling wheel) may rotate towards the lateral side of the wire by a rotatable joint so as to avoid or bypass the obstacle(s) on the wire, wherein the rotatable portion of the front walking arm, after the rotation, may reach the position as shown in FIG. 2b.

As the robot further advances (towards the right in the figure), the front walking arm passes (or bypasses) through the lateral side of the obstacle(s) without any blocking by the obstacle(s); and after surmounting the obstacle(s), the front walking arm may move in the reverse direction (such as necessary rotating and/or upward/downward movement) so as to return to the original working position along the same route, that is, the rolling wheel of the front walking arms returns onto the wire and is in the online state again, so as to be supported on the wire, as shown in FIG. 2c.

The middle walking arm may stop in front of the obstacle(s) (on the right side of the middle walking arm in FIG. 2d) (wherein the middle pressing wheel, if provided, may be released), the rolling wheel of the middle walking arm rises (it should be understood that the rolling wheel may rise by itself, or may rise by the telescopic movement of a telescopic portion, such as a telescopic joint or the like, of the middle walking arm), such that the rolling wheel can release from the wire, i.e. being in the offline state, as shown in FIG. 2d.

The rolling wheel of the middle walking arm descends to a position below the wire, such as a position directly below the wire or a position slantingly below the wire (in the process of descending from above the wire to below the wire, the rolling wheel may slightly rotate to avoid being blocked by the wire if it is necessary), reaching the position shown in FIG. 2e, so as to avoid the shown obstacle(s) installed above the wire. Though the embodiment of FIG. 2e shows that the rolling wheel of the middle walking arm descends to the position below the wire to avoid the obstacle(s), in other embodiments, for example, when a portion of the obstacle locates below the wire and may obstruct the walking arm, the middle walking arm may avoid the obstacle(s) in a way similar to that of the front walking arm as described above, that is, the rotatable portion of the middle walking arm (such as the end portion having the rolling wheel) may rotate to the lateral side of the wire by the rotatable joint so as to avoid or bypass the obstacle(s) on the wire.

As the robot further advances (towards the right in the figure), the middle walking arm passes (or bypasses) below the obstacle(s) without any blocking by the obstacle(s); and after surmounting the obstacle(s), the middle walking arm may move in the reverse direction (such as necessary rotating and/or upward/downward movement) so as to return to the original working position along the same route, that is, the rolling wheel of the middle walking arms returns onto the wire and is in the online state again, so as to be supported on the wire, as shown in FIG. 2f.

The rear walking arm may stop in front of the obstacle(s) (on the right side of the rear walking arm in FIG. 2a) (wherein the rear pressing wheel or clamping jaw, if provided, may be released), the rolling wheel of the rear walking arm rises (it should be understood that the rolling wheel may rise by itself, or may rise by the telescopic movement of a telescopic portion, such as a telescopic joint or the like, of the rear walking arm), such that the rolling wheel can release from the wire, i.e. being in the offline state, as shown in FIG. 2g.

The rolling wheel of the rear walking arm descends to a position below the wire, such as a position directly below the wire or a position slantingly below the wire (in the process of descending from above the wire to below the wire, the rolling wheel may slightly rotate to avoid being blocked by the wire if it is necessary), reaching the position shown in FIG. 2h, so as to avoid the shown obstacle(s) installed above the wire. Though the embodiment of FIG. 2h shows that the rolling wheel of the rear walking arm descends to the position below the wire to avoid the obstacle(s), in other embodiments, for example, when a portion of the obstacle locates below the wire and may obstruct the walking arm, the rear walking arm may avoid the obstacle(s) in a way similar to that of the front walking arm as described above, that is, the rotatable portion of the rear walking arm (such as the end portion having the rolling wheel) may rotate to the lateral side of the wire by the rotatable joint so as to avoid or bypass the obstacle(s) on the wire.

As the robot further advances (towards the right in the figure), the rear walking arm passes (or bypasses) below the obstacle(s) without any blocking by the obstacle(s);

and after surmounting the obstacle(s), the rear walking arm may move in the reverse direction (such as necessary rotating and/or upward/downward movement) so as to return to the original working position along the same route, that is, the rolling wheel of the rear walking arms returns onto the wire and is in the online state again, so as to be supported on the wire, as shown in FIG. 2*i*.

Therefore, the front walking arm, the middle walking arm and the rear walking arm of the walking mechanism move to surmount obstacle(s) on the wire in sequence such that the robot moves from the left side of the obstacle(s) to the right side of the obstacle(s), thereby completing obstacle surmounting.

In one preferential embodiment, after the front walking arm and the middle walking arm have surmounted/bypassed the obstacle(s) in sequence and re-hung on the wire (i.e. in the online state), the working arms may move from a position at the rear portion of the robot to a position at the front portion of the robot, and then the rear walking arm surmounts/bypasses the obstacle(s). Due to such movability of the working arms, the overall gravity center of the robot can be moved forwards and falls between the front walking arm and the middle walking arm, thereby realizing better overall counterweight and thus ensuring running and working stability and safety of the robot.

Preferentially, in any embodiment of the invention, the mounting mechanism comprises a winch structure fixed to the main body and a positioning structure connected to the winch structure, wherein the sling connected with the hook penetrates through the positioning structure to wind on the winch structure.

Therefore, the hook may be pre-hung on the wire (such as using an unmanned aerial vehicle (UAV) to hang the hook) and then is connected, at its lower end, to the sling; the sling is tightened through rotation of the winch structure, such that the robot may rise along the sling connected with the hook hanging on the wire, and the positioning structure is used to ensure that the robot can be kept in an appropriate mounting state. After being positioned on the wire (i.e. in the online state) by the rolling wheels at the ends of the at least two walking arms of the walking mechanism, the robot can be hung on the wire (i.e. being supported and hung by the rolling wheels of the walking arms). Then the positioning structure may be controlled to move so as to drive the hook to release from the wire, thereby completing mounting operation of the robot.

In an embodiment, the sling may be preferentially made of insulating wear-resistant materials.

In an embodiment, preferentially, the mounting mechanism may comprise a lifting speed controller which controls the power output to control the mounting (moving up) or demounting (moving down) speed of the robot, so as to ensure safe upward or downward movement of the robot.

Preferentially, in any embodiment of the invention, the positioning structure comprises a cone base below the hook, wherein the cone base has a conical hole and a central hole, with conical hole aligned with a cone located at a lower end of the hook and the sling extending to penetrate through the central hole.

Therefore, when the robot rises to an appropriate position, the cone base rises such that the cone is aligned with and inserted downwards into the conical hole of the cone base for accurate alignment, and the inner surface of the conical hole of the cone base and the outer surface of the cone (i.e. the conical surface, such as the circular conical surface or the pyramid surface) are matched with each other and abutted against each other to realize accurate positioning. Therefore, the conical hole of the cone base and the cone are formed into an integral structure through tightly combination of adjacent surfaces thereof, so as to facilitate operations for installing onto the wire. Especially in the mounting operation of the robot, the hook, the cone, the conical hole of the cone base, and the supporting fork are aligned in sequence from top to bottom, and the sling connected onto the hook penetrates downwards through the conical hole of the cone base and the central hole of the supporting fork, such that the cone, the conical hole of the cone base, the central hole of the supporting fork and the sling can be coaxial, thereby ensuring alignment accuracy of mounting of the robot and increasing flexibility and adaptability of the mounting and demounting of the robot.

In an embodiment, the cone may be a separate part which is connected with or fixed to the hook. For example, in a preferred embodiment, the cone and the hook may be connected with each other and assembled together through threads.

In other embodiments, the cone and the hook may be integrated into a single part as required.

Preferentially, in any embodiment of the invention, the positioning structure comprises a supporting fork located below the cone base, and the cone base is supported within the supporting fork and can rotate relative to the supporting fork (for example, in an embodiment, the cone base may be hinged at its bottom to the supporting fork).

Therefore, when the robot hangs in position on the wire through the rolling wheels of the walking arms of the walking mechanism, the cone base may be controlled to rise continuously so as to drive the cone abutting against the cone base to move upwards, such that the sling connected with the hook hanging on the wire is loosened, and after the sling is loosened sufficiently, the hook may be pushed upwards to above the wire, then the cone base can be controlled to turn downwards relative to the supporting fork below to drive the hook to swing outwards and release from the wire, thereby completing mounting operation of the robot.

In an embodiment, the cone base and the supporting fork are hinged with each other. The cone base may be turned downwards relative to the supporting fork below to drive the hook above to turn and release from the wire when necessary (for example, when the walking arms are already in position on the wire and it is necessary for the hook to be released from the wire). In this case, for example, in a preferred embodiment, it is possible to allow only the cone base to turn downwards (such as turning in a vertical plane) relative to the supporting fork when necessary (such as when receiving a control command), while prohibiting the cone base from rotating in the horizontal plane relative to the supporting fork.

Preferentially, in any embodiment of the invention, the winch structure comprises a drive reel installed on a drive reel seat and two driven reels installed on a driven reel seat, wherein the drive reel seat and the driven reel seat are hinged to each other at the edges thereof, the sling penetrates through the positioning structure and then sequentially winds on one of the driven reels, the drive reel and the other of the driven reels, so as to extend along a shape of "8".

With the sling winding on the reels (such as the drive reel and the driven reels) in the shape of "8", the sling can be winded/wrapped more tightly to the reel(s), so as to increase friction force between the sling and the reel(s). When it is necessary to lift the robot for the mounting operation, a motor (such as a worm gear motor) may be controlled to drive the winch structure to rotate and thus make the drive reels to rotate, and the rotating reels can, by the friction force, provide an upward moving force for the robot. The drive reel and driven wheels may have the same or different sizes (such as diameters) as required.

In a preferential embodiment, the winch structure may comprise a single drive reel and two driven reels arranged in parallel (such as the two driven reels being coaxial). More preferentially, the axes of the single drive reel and the two driven reels may be parallel with each other.

In an preferential embodiment, the sling may wind and pass the first driven reel, the single drive reel and the second driven reel in sequence, such that the sling is winded/wrapped between the drive reel and the driven reels to form winding in the shape of "8".

In an embodiment, the sling may wind and pass the first driven reel, the single drive reel and the second driven reel in sequence and then is fixedly connected onto the ground or other stationary bases.

In an embodiment, in the upward or downward movement process of the live working robot, when the sling (such as an insulating rope) bears a driving load, the drive reel seat may rotate towards the driven reel seat hinged thereto (i.e. the included angle between the drive reel seat and the driven reel seat is reduced) through a hinged structure (such as a hinge) at the edge of the drive reel seat and the driven reel seat, such that the drive reel moves towards the driven reels and the insulating rope can be tightly clamped between the drive reel and the driven reels to achieve self-locking. When the insulating rope is free from load, the drive reel seat may move in a reserve direction and falls back under the effect of gravity, then the insulating rope is released, and the drive reel seat finally returns to the original position.

Preferentially, in any embodiment of the invention, the mounting mechanism comprises a mounting motor and a transmission system connected to the mounting motor.

In consideration of the influences of wind and of the self weight of the robot, the robot in the air may swing or rotate about the sling. In this regard, the mounting mechanism and the main body of the robot (such as a frame portion thereof) may be adjusted, through a pair of gears engaged to transfer torque, for the position of the robot relative to the wire, thereby facilitating follow-up operations, such as the rolling wheels of the walking arms of the walking mechanism moving in position on the wire.

Preferentially, in any embodiment of the invention, a pinion is installed on the main body; a big gear engaged with the pinion is fixedly arranged on the positioning structure.

Therefore, during the mounting operation, the positioning structure of the mounting mechanism may remain substantially stationary, so when the pinion is driven to rotate, the pinion engaged with the big gear will rotate around the big gear, so as to drive the main body of the robot (such as its frame and its box) to rotate correspondingly to adjust the overall position and posture of the robot (such as the position and posture of the robot relative to the wire), thereby facilitating follow-up operations, such as the rolling wheels of the walking arms of the walking mechanism moving in position on the wire.

In an embodiment, the pinion is installed on the main body of the robot (such as the frame thereof), while the big gear engaged with the pinion is fixedly installed on the supporting fork of the mounting mechanism. After the conical hole of the cone base is completely abutted the cone above, the hook, the cone, the cone base (including the conical hole), the supporting fork and the big gear of the mounting mechanism form an integrated structure (i.e. there is no relative movement between these components). In this case, the pinion may be driven to rotate. As the integrated structure as described above is stationary, the pinion engaged with the big gear will revolve around the big gear (i.e. revolve around the supporting fork on which the big gear is fixedly provided), so as to drive the main body (such as the frame and the box) of the robot to rotate correspondingly to adjust the overall position and posture of the robot (such as the position and posture of the robot relative to the wire), thereby facilitating follow-up operations, such as the rolling wheels of the walking arms of the walking mechanism moving in position on the wire.

Figure 3:
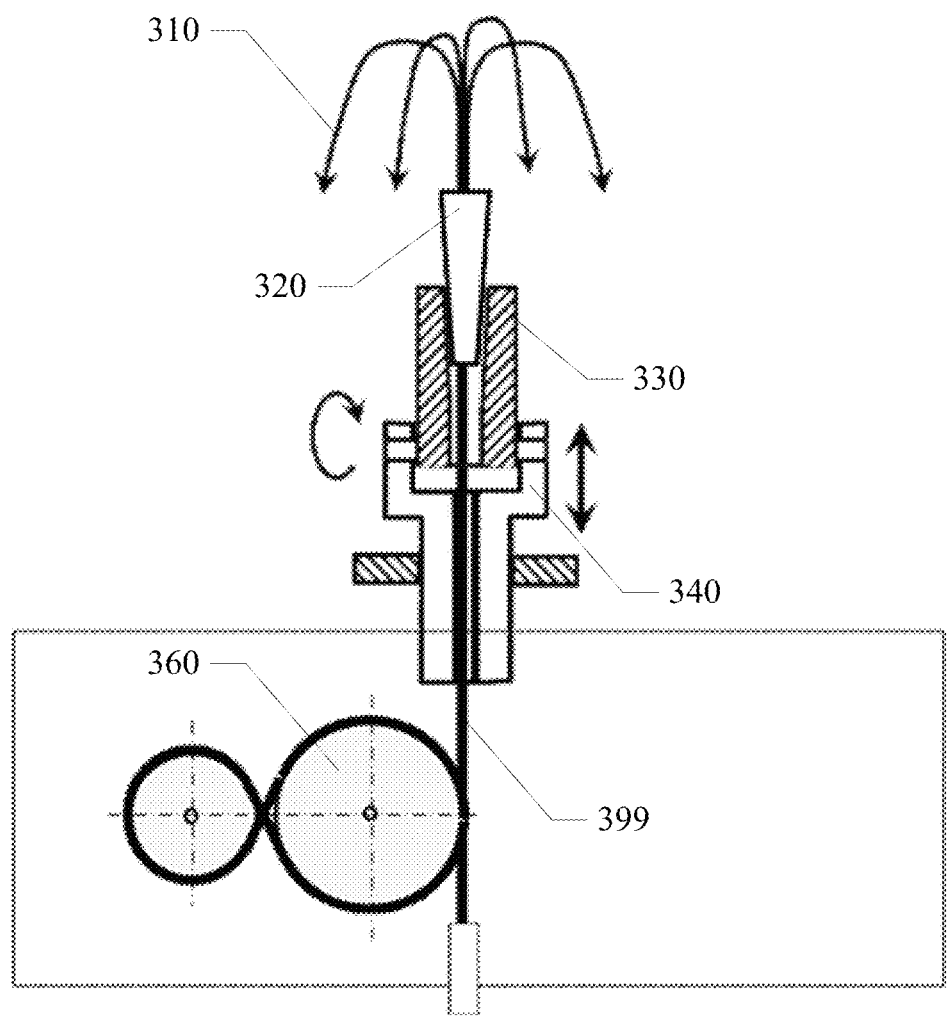
FIG. 3 is the structure diagram of a mounting mechanism of the live working robot according to an embodiment of the invention.

FIG. 3 is the structure diagram of a mounting mechanism of the live working robot according to an embodiment of the invention.

As can be seen from the embodiment of FIG. 3, the mounting mechanism comprises a hook 310, and further comprises: a winch structure 360 fixed to the main body and a positioning structure connected with the winch structure, wherein the sling 399 connected with the hook penetrates through the positioning structure to wind on the winch structure 360.

The positioning structure may comprise: a cone base 330 below the hook 310, wherein the cone base 330 has a conical hole 333 and a central hole, with conical hole 333 aligned with and matching in shape with a cone 320 located at a lower end of the hook 310 and the sling 399 extending to penetrate through the central hole.

The positioning structure may comprise a supporting fork 340 located below the cone base 330, and the cone base 330 is supported within the supporting fork 340 and can rotate relative to the supporting fork 340.

In an embodiment, the mounting mechanism comprises the following parts, and these parts cooperate to realize mounting of the live working robot:

Step 1, the hook is hung on the wire through an UAV (in this case, the hook and the cone are in the air, while other parts of the robot are still on the ground), wherein the sling (such as an insulating rope) is connected at the lower end of the hook, and then in the process the robot climbing upwards along the insulating rope, the hook and the insulating rope bear the weight load of the whole robot, so the hook is positioned on the wire under the effect of the weight load.

Step 2, the robot is off the ground as the support, and is connected and loaded onto the sling (such as an insulating rope) at the lower end of the hook, then the mounting motor (such as a worm gear motor) starts up to rotate the drive reel, the drive reel seat rotates around the hinge towards one side of the driven reel seat such that the bottom of the drive reel seat and the worm gear motor are detached from the box and tilt upwards (that is, the bottom surface of the drive reel seat is not overlapped (coincident) with the bottom surface of the box, but is at an angle thereto), the drive reel and the driven reels tightly clamp the insulating rope therebetween, the mounting motor drives the drive reel to rotate to tighten the insulating rope and also drives the driven reels to rotate through the insulating rope (the insulating rope here is similar to a belt), and the drive reel tightens the insulating rope such that the drive reel climbs upwards along the insulating rope. The drive reel seat and the driven reel seat are hinged at the edges, the driven reel seat are fixedly connected with the box of the main body which is connected with the frame of the main body, so the climbing of the drive reel drives the whole robot to rise. The two driven reels may be coaxially installed on the same driven reel seat, the insulating rope enters into one driven reel, then enters into the drive reel to wind a circle, and then enters into the other driven reel, finally penetrating therefrom to the ground.

Step 3, the robot rises gradually, and the cone base moves gradually towards the cone.

Step 4, after the robot rises to a certain height, the cone above starts to enter into the conical hole of the cone base (having a conical surface), the robot continues rising until the upper end surface of the conical hole is overlapped with the lower end surface of the cone, and then the conical hole of the cone base is completely abutted/contacted to the cone. The upward force produced by the winch drives the conical hole of the cone base to tightly press against the cone, the cone base and the cone are tightly contacted to form high friction therebetween and thus it is difficult for the cone base and the cone to rotate with respect to each other. In this case, the wire, the hook, the cone, the cone base, the supporting fork hinged with the cone base, and the big gear fixedly connected on the supporting fork are integrally connected and remain substantially stationary. Then, the frame (provided with the pinion) of the main body may rotate relative to the supporting fork (fixedly provided with the big gear engaged with the pinion at all time), so the frame and box of the main body may rotate relative to the supporting fork (wherein, for example, the rotating force may be provided by the pinion).

Step 5, the motor on the frame of the main body drives the pinion to rotate, and the pinion revolves around the big gear, so the frame of the main body fixedly connected with the pinion will revolve around the big gear and the supporting fork. Therefore, all parts (comprising a bearing seat carrying the supporting fork) fixedly connected with the frame of the main body will rotate around the supporting fork in the air (wherein the rotatable joint allows a relative rotation of the supporting fork relative to the bearing seat). In this way, the robot can self-rotate in the horizontal plane, and the position and posture of the walking mechanism of the robot in the horizontal plane relative to the wire may be adjusted as required.

Step 6, the robot stops after being adjusted to the correct position, wherein as an example, the correct position may be configured such that the front end surface of the box of the main body is parallel with the wire.

Step 7, after the front walking arm and the rear walking arm rise to a certain height, they rotate such that their respective rolling wheels are aligned with the wire; then the front walking arm and the rear walking arm descend such that the rolling wheels contact the upper surface of the wire and hang in position on the wire to bear the weight load of the robot.

Step 8, the front walking arm and the rear walking arm retract such that the robot rises by the supporting of the front walking arm and the rear walking arm, and the conical hole of the cone base rises accordingly to push the hook upwards to release/depart from the wire.

Step 9, the swing motor drives the cone base to swing, so as to drive the hook to swing outwards to release/depart from the wire, thereby completing the mounting.

The live working robot provided in the embodiment(s) of the invention may be used on the lines of 110-220 kV single wires and the horizontal dual wires. It not only can be mounted to and demounted from the wire automatically and complete various operating tasks, but also can successfully surmount/bypass various obstacle(s) on the wire, such as shockproof hammers, insulators, wire clamps and the like.

The live working robot provided in various embodiments of the invention not only can be mounted to and demounted from the wire automatically and complete various working tasks, but also use the structure of three walking arms to solve the problem of gravity center instability in the case of single-arm hanging during obstacle surmounting process, thereby improving the stability and reliability in the obstacle surmounting and walking process.

Furthermore, the live working robot provided in various embodiments of the invention may have at least one of the following features: each of the three walking arms may have only two degrees of freedom of movement, the mounting mechanism may have two degrees of freedom of movement, the working arms may have three degrees of freedom of movement, and various mechanisms may be independent from each other. With less degrees of freedom of movement, the robot will be simple in structure and easy to control.

The live working robot provided in various embodiments of the invention may have at least one of the following advantages:

1) The structure of three walking arms is used to solve the problem of gravity center instability in the case of single-arm hanging during obstacle surmounting process, thereby improving the stability and reliability in the obstacle surmounting and walking process.

2) Each of the three walking arms may have only two degrees of freedom of movement, the mounting mechanism may have two degrees of freedom of movement, the working arms may have three degrees of freedom of movement, and various mechanisms may be independent from each other. With less degrees of freedom of movement, the robot will be simple in structure and easy to control.

3) With an automatic mounting mechanism, the robot does not need any additional lifter to assist mounting the wire, thus the cost is lowered and the automation degree is higher.

In sum, with the embodiments of the invention, the live working robot used for running and operation along wires of high-voltage transmission lines may realize obstacle surmounting of the live working robots along the wires safely and conveniently.

In the description for multiple components of this invention, multiple juxtaposed features connected via "and/or" mean that one or more than one (one or many) of the multiple juxtaposed features may be included. For example, "a first component and/or second component" means one or more of the first component and the second component, i.e. only the first component, only the second component, or the first component and the second component (both included simultaneously).

Various embodiments provided herein in the invention may be combined with one another as required. For example, the features from any two, three or more embodiments may be combined with one another to form a new embodiment of the invention, which is also within the protection scope of the invention, unless otherwise specified or the new embodiment cannot be implemented due to technical conflicts.

Those skilled in the field of the invention should understand that the above embodiments are only specific embodiments of the invention and are not intended to limit the scope of the invention. Any improvement, change or equivalent substitution within the spirit and principle of the invention are within the protection scope of the invention.

The invention claimed is:

1. A live working robot used for running and operating along wires of high-voltage transmission lines, comprising:
   a main body;
   a walking mechanism, wherein the walking mechanism comprises three walking arms installed on the main body and spaced apart from one another, a rolling wheel is arranged at an end of each walking arm and is in an online state when being located on an upper surface of a wire or in an offline state when being separated from the wire; the rolling wheels of at least two walking arms are in the online state; at least one part of the walking arm can extend and retract in the vertical direction to change the vertical position of the rolling wheel relative to the wire, and at least one walking arm has a rotatable portion which can rotate to change the position of the rolling wheel relative to the wire; wherein
   the walking arms comprise a front walking arm, a middle walking arm and a rear walking arm in sequence along the advancing direction of the live working robot, wherein the rolling wheels of the front walking arm and the rear walking arm are drive rolling wheels connected to a drive motor, and the rolling wheel of the middle walking arm is a driven rolling wheel;
   a mounting mechanism, comprising a hook and a sling connecting the hook to the main body; and
   a working arm, installed on the main body and provided at its end with a tool interface.

2. The live working robot according to claim 1, wherein, the rotatable portion of at least one of the walking arms can rotate in the horizontal plane to change the horizontal position of the rolling wheels relative to the wire.

3. The live working robot according to claim 2, wherein, the rotatable portion of each of the walking arms can rotate in the horizontal plane to change the horizontal position of the rolling wheels of the walking arms relative to the wire.

4. The live working robot according to claim 1, wherein, the rotatable portion of at least one of the walking arms can rotate in the non-horizontal plane to change the horizontal position and/or vertical position of the rolling wheels relative to the wire.

5. The live working robot according to claim 1, wherein, at least one of the walking arms extends along a straight line, a broken line or a curve.

6. The live working robot according to claim 1, wherein, a front walking arm of the walking arms is provided with a front pressing wheel, wherein the rolling wheel of the front pressing arm is aligned with the front pressing wheel and the wire is clamped between the rolling wheel and the front pressing wheel;
and/or
a rear walking arm of the walking arms is provided with a rear pressing wheel, wherein the rolling wheel of the rear pressing arm is aligned with the rear pressing wheel and the wire is clamped between the rolling wheel and the rear pressing wheel.

7. The live working robot according to claim 1, wherein, the front walking arm of the walking arms is provided with a clamping jaw for grasping the wire;
and/or
the rear walking arm of the walking arms is provided with a clamping jaw for grasping the wire.

8. The live working robot according to claim 1, wherein, the vertical telescopic movement of the walking arm is driven by a telescopic movement motor and the rotary movement of the walking arms is driven by a rotating movement motor;
or
each of the walking arms is independently driven by its own drive motor.

9. The live working robot according to claim 1, wherein, the rotatable portions of the three walking arms are located on different sides of the wire.

10. The live working robot according to claim 1, wherein, the working arm has three degrees of freedom of movement in three mutually orthogonal directions.

11. The live working robot according to claim 1, wherein, the working arm is movably installed on the main body and is moveable in a direction parallel to the advancing direction of the live working robot.

12. The live working robot according to claim 1, wherein, the mounting mechanism comprises a winch structure fixed to the main body and a positioning structure connected to the winch structure, wherein the sling connected with the hook penetrates through the positioning structure to wind on the winch structure.

13. The live working robot according to claim 12, wherein,
the positioning structure comprises a cone base below the hook, wherein the cone base has a conical hole and a central hole, with conical hole aligned with and matching in shape with a cone located at a lower end of the hook and the sling extending to penetrate through the central hole.

14. The live working robot according to claim 13, wherein,
the positioning structure comprises a supporting fork located below the cone base, and the cone base is supported within the supporting fork and can rotate relative to the supporting fork.

15. The live working robot according to claim 12, wherein,
the winch structure comprises a drive reel installed on a drive reel seat and two driven reels installed on a driven reel seat, wherein the drive reel seat and the driven reel seat are hinged to each other at the edges thereof, the sling penetrates through the positioning structure and then sequentially winds on one of the driven reels, the drive reel and the other of the driven reels, so as to extend along a shape of "8".

16. The live working robot according to claim 12, wherein, he mounting mechanism comprises a mounting motor and a transmission system connected to the mounting motor.

17. The live working robot according to claim 12, wherein,
a pinion is installed on the main body; and
a big gear engaged with the pinion is fixedly arranged on the positioning structure.

* * * * *

UNITED STATES PATENT AND TRADEMARK OFFICE
CERTIFICATE OF CORRECTION

PATENT NO. : 10,406,675 B2
APPLICATION NO. : 15/475813
DATED : September 10, 2019
INVENTOR(S) : Xiaqing Liu et al.

It is certified that error appears in the above-identified patent and that said Letters Patent is hereby corrected as shown below:

In the Claims

Column 18, Line 53:
Delete "he" and replace with "the".

Signed and Sealed this
Nineteenth Day of January, 2021

Andrei Iancu
*Director of the United States Patent and Trademark Office*